April 20, 1965

R. R. CARNEY 3,178,897

CRYOGENIC APPARATUS

Filed April 24, 1963

INVENTOR.
RICHARD R. CARNEY.
BY

ATTORNEY

United States Patent Office 3,178,897
Patented Apr. 20, 1965

3,178,897
CRYOGENIC APPARATUS
Richard R. Carney, Kenmore, N.Y., assignor to Union
Carbide Corporation, a corporation of New York
Filed Apr. 24, 1963, Ser. No. 275,365
9 Claims. (Cl. 62—45)

The present invention is related to cryogenic liquid storage containers, particularly those containers used for storing such liquids as liquid helium, hydrogen and neon.

The present invention comprises a double-walled cryogenic liquid storage container having an inner vessel and an outer shell spaced therefrom to provide a thermal insulating space therebetween. Support means within the insulating space support the inner vessel in the outer shell. Liquid filling and withdrawal means extend through the insulating space into the inner vessel and vapor venting means extend from the inner vessel out through the insulating space. The support means, or the filling and withdrawal means, or both are thermally connected to the venting means to reduce heat inleakage to the inner vessel.

An object of the present invention is to provide a double-walled cryogenic liquid storage container having improved thermal performance as measured by the rate of evaporation of the stored cryogenic liquid due to heat inleakage. Another object is to provide such a container wherein the sensible heat of unavoidably evaporated vapor is utilized to reduce heat inleakage. A further object is to provide such a container wherein the inner vessel supporting means are thermally connected to the vapor venting means to reduce heat inleakage along the support means. Still another object is to provide such a container wherein the liquid filling means are thermally connected to the vapor venting means to reduce heat inleakage along the liquid filling means. A still further object is to provide such a container wherein the aforementioned means are substantially unidirectionally thermally connected to the vapor venting means. These and other objects and advantages of the present invention are hereinafter described with reference to the figures, of which:

Figure 1:
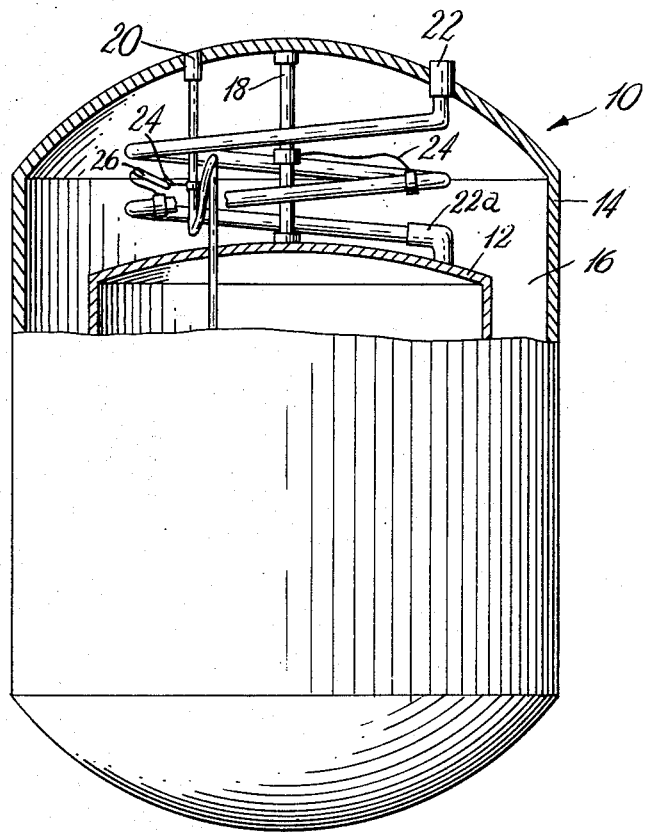
FIGURE 1 is a vertical view of a container partially in section illustrating features of the present invention.

Referring to FIGURE 1, a cryogenic liquid storage container 10 comprises, according to the present invention, an inner vessel 12; an outer shell 14 surrounding the inner vessel 12 and spaced therefrom to provide an evacuable insulating space 16 therebetween; at least one support member 18 connecting the inner vessel 12 to the outer shell 14 within the insulating space 16 to support the inner vessel; a liquid filling and withdrawal conduit 20 (hereinafter referenced as liquid conduit 20) extending through the insulating space 16 into the inner vessel 12; a vapor venting conduit 22 (hereinafter referenced as vapor conduit 22) extending out of the inner vessel 12 through the insulating space 16; and thermal connecting means 24 thermally connecting relatively warm sections of the support member 18 and the liquid conduit 20 to a relatively cold section of the vapor conduit 22, and providing preferential heat transfer from the support member 18 and the liquid conduit 20 to the vapor conduit 22. This arrangement of the container 10 permits the absorption of heat transferred from the support member 18 and the liquid conduit 20 by vapor passing through the vapor conduit 22. If desired, the liquid conduit 20 and the vapor conduit 22 may be coiled within insulating space 16 in various configurations, one of which is shown with respect to the liquid conduit 20 and the vapor conduit 22, to provide adequate elongation.

Inasmuch as the support member 18 and the liquid conduit 20 connect the warm outer shell 14 to the cold inner vessel 12, a temperature gradient, caused by conductive heat leakage, exists along them even though they are made of low thermal conductivity materials and elongated to reduce heat leakage. To provide preferential heat transfer from the support member 18 and the liquid conduit 20 to the vapor conduit 22 rather than to the inner vessel 12, therefore, the thermal connecting means 24 must be: (1) connected between relatively warm sections of the support member 18 and the liquid conduit 20 and a relatively cold section of the vapor conduit 22; and (2) constructed to have a thermal conductance at least equal to, and preferably greater than, the thermal conductance of the sections of the support member 18 and the liquid conduit 20 downstream (i.e. nearer the inner vessel 12) of the relatively warm sections to which the thermal connecting means are attached. A substantial portion of the heat leakage along the support member 18 and the liquid conduit 20 will then, in effect, be short-circuited into the vapor venting through the vapor conduit 22 rather than being permitted to travel into the inner vessel 12. Providing the thermal connecting means in the above-described manner not only reduces heat leakage through the container structure into the inner vessel, but also permits recovering a substantial portion of the sensible refrigeration in the vented vapor that would otherwise be wasted.

The quantity of heat which is transferable to the vapor conduit 22 by the thermal conducting means 24 cannot be increased above a particular value depending upon the relationship between the thermal conductance of the support member and filling conduit designs and the heat-absorbing capacity of the vented vapor. If the thermal connecting means 24 is imperfectly located, its effectiveness will be reduced below the optimum value, resulting in more heat being conducted into the inner vessel 12. The point of attachment of the termal connecting means 24 to the vapor conduit 22 must be cold enough to permit heat transfer in the desired direction. This point of attachment must also be far enough removed from the cold vapor conduit connection 22a on the inner vessel 12 that the transferred heat will be absorbed by the vapor rather than conducted along the vapor conduit 22 into the inner vessel 12.

Analysis has shown that the most effective point to attach the thermal connecting means 24 to the support member 18 is near the support member midpoint.

When the liquid conduit 20 is used to fill the inner vessel 12 with cryogenic liquid or to withdraw liquid therefrom, the temperature of the liquid conduit 20 will undoubtedly fall below the temperature of the relatively cold section of the vapor conduit 22 to which the thermal connecting means 24 is attached. During filling or withdrawal, therefore, the thermal connecting means 24, will tend to conduct heat into the liquid conduit 20. Consequently, to reduce this undesirable reverse heat conduction, it is desirable to include a thermal resistance 26 in the thermal connecting means 24 which connects the liquid conduit 20 to the vapor conduit 22.

Thermal resistance 26 may be constructed of material having a thermal conductivity that decreases sharply with decreasing temperature, such as stainless steel in which case it should be thermally positioned near the liquid conduit 20. Therefore, when the liquid conduit 20 is used to fill or withdraw cryogenic liquid from the inner vessel 12, the thermal conductivity of the thermal resistance 26 will be reduced due to the drop in temperature thereby impeding the reverse heat conduction. Because the use of the thermal resistance 26 may decrease the efficiency of the thermal connecting means 24, it may be necessary to add a second thermal connecting means (not shown), including a thermal resistance, between another pair of locations on the liquid conduit 20 and the vapor conduit 22.

Figure 2:
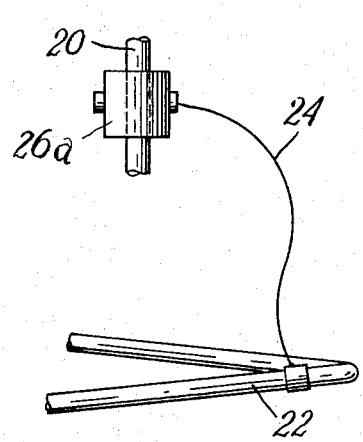
FIGURES 2 and 3 are modified views of a segment of the container shown in FIGURE 1 illustrating other features of the present invention.
Figure 3:
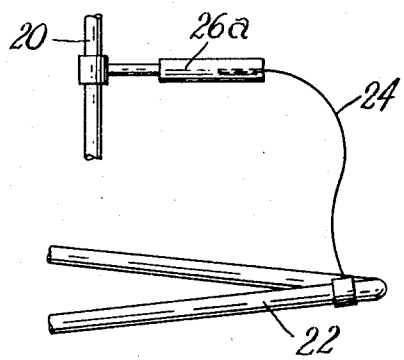

As an alternative to the type of variable thermal resistance 26 just described, it may be desirable to use a unidirectional thermal resistance such as shown in FIGURES 2 and 3 which comprises a thermal check valve 26a in the form of a tube filled with vapor. The vapor must have a higher boiling point than the cryogenic liquid to be stored in container 10 and a relatively high gaseous thermal conductivity so that the normal heat conductance of the thermal connecting means will not be impaired. When the liquid conduit 20 is used to fill the inner vessel 12 with cryogenic liquid or withdraw liquid therefrom, the lowered temperature of the liquid conduit 20 will cause the vapor within the tube to liquefy and, preferably, solidify. When this occurs, a relatively good vacuum will be formed within the tube resulting in very poor heat conductance through the thermal resistance. Under this condition, what heat conductance there is will occur principally through the thin walls of the tube. If the cryogenic liquid stored is helium or hydrogen, for example, neon is the preferred vapor.

The thermal connecting means 24 are preferably constructed of highly conductive wires of copper or aluminum which are attached to the support member 18, the liquid conduit 20, and the vapor conduit 22 by means of a thermally conductive joint such as by soldering if attached to metal or by use of an adhesive if attached to plastic material. Use of highly conductive material such as copper or aluminum permits using any length which is convenient from an ease-of-assembly standpoint inasmuch as the choice of a suitable length of the material may vary within wide limits without significantly effecting its overall thermal conductivity. It is particularly desirable to use high purity metal such as electrolytic tough pitch copper or one of the 1100 series aluminum alloys, which exhibit an inverse relationship between temperature and thermal conductivity within the range of 30° K.–150° K., when cryogenic liquid withdrawal is accomplished by pressurizing the inner vessel 12 through the vapor conduit 22 with relatively warm gas. Consequently, within the above temperature range, the thermal conductivity of the thermal connecting means will decrease with increasing temperature, thereby impeding reverse heat conductance from the artificially-warmed vapor conduit.

The liquid conduit 20, rather than comprising both a cryogenic liquid filling and withdrawal conduit, may be used as one or the other only, and a similar conduit (not shown) provided to perform the other function. In such case, a thermal connecting means of the type described with reference to the liquid conduit 20 would be required preferably for the withdrawal conduit; including, preferably, a thermal resistance.

Although preferred embodiments of the invention have been described in detail, it is contemplated that modifications may be made and that some features may be employed without others, all within the spirit and scope of the invention as set forth in the disclosure and claims.

What is claimed is:

1. A cryogenic liquid storage container which comprises an inner vessel; an outer shell surrounding said inner vessel and spaced therefrom to provide a thermal insulating space therebetween; at least one support member within the insulating space for supporting said inner vessel; a liquid conduit extending through said insulating space; a vapor conduit extending through said insulating space; and means thermally connecting a relatively warm section of said support member to a relatively cold section of said vapor conduit and providing preferential heat transfer from said support member to said vapor conduit, thereby reducing the heat leakage into said inner vessel by permitting the absorption of heat transferred from said support member by vapor passing through said vapor conduit, such thermal connecting means comprising material having a thermal conductance at least equal to the thermal conductance of the section of said support member downstream of said relatively warm section of said support member, 2. A cryogenic liquid storage container which comprises an inner vessel; an outer shell surrounding said inner vessel and spaced therefrom to provide a thermal insulating space therebetween; a least one support member within the insulating space for supporting said inner vessel; a liquid conduit extending through said insulating space; a vapor conduit extending through said insulating space; and means thermally connecting a relatively warm section of said liquid conduit to a relatively cold section of said vapor conduit and providing preferential heat transfer from said liquid conduit to said vapor conduit, thereby reducing the heat leakage into said inner vessel by permitting the absorption of heat transferred from said liquid conduit by vapor passing through said vapor conduit, such thermal connecting means comprising material having a thermal conductance at least equal to the thermal conductance of the section of said liquid conduit downstream of said relatively warm section of said liquid conduit.

3. Apparatus according to claim 2 wherein the thermal connecting means includes a thermal resistance for impeding reverse heat conduction from said vapor conduit to said liquid conduit.

4. Apparatus according to claim 3 wherein said thermal resistance comprises material having a thermal conductivity which varies sharply with temperature.

5. Apparatus according to claim 3 wherein said thermal resistance comprises a unidirectional thermal check valve with a tube filled with vapor having a boiling point higher than the cryogenic liquid to be stored in the container.

6. A cryogenic liquid storage container which comprises an inner vessel; an outer shell surrounding said inner vessel and spaced therefrom to provide an evacuable insulating space therebetween; at least one support member within the insulating space for supporting said inner vessel; a liquid conduit extending through said insulating space; a vapor conduit extending through said insulating space; and means thermally connecting relatively warm sections of said support member and said liquid conduit with a relatively cold section of said vapor conduit and providing preferential heat transfer from said support member and said liquid conduit to said vapor conduit, thereby reducing the heat leakage into said inner vessel by permitting the absorption of heat transferred from said support member and said liquid conduit by vapor passing through said vapor conduit, such thermal connecting means comprising material having a thermal conductance at least equal to the thermal conductance of the sections of said support member and said liquid conduit downstream of said relatively warm sections of said support member and said liquid conduit.

7. Apparatus according to claim 6 wherein the thermal connecting means includes a thermal resistance for impeding reverse heat conduction from said vapor conduit to said liquid conduit.

8. Apparatus according to claim 7 wherein said material comprising said thermal connecting means is constructed in the form of wire.

9. Apparatus according to claim 6 wherein the container is constructed to store a cryogenic liquid selected from the group consisting of helium and hydrogen; and wherein said thermal resistance comprises a unidirectional thermal check valve with a tube filled with neon.

References Cited by the Examiner
UNITED STATES PATENTS

| | | | |
|---|---|---|---|
| 1,976,688 | 10/34 | Dana et al. | 62—45 |
| 3,097,084 | 7/63 | Putman | 62—45 |

OTHER REFERENCES

"Cryogenics," December 1960, article by Rollin et al. on pages 75–76 relied on. (Copy in Scientific Library and in Group 380, 62–514A.)

"Instruments and Experimental Techniques" (Russia), No. 4, July-August 1961, article by Fradkov on pages 170–173 relied on. (Translated copy in Group 380, 62–45.)

ROBERT A. O'LEARY, *Primary Examiner.*